June 23, 1970  H. GRÅSVOLL  3,516,226

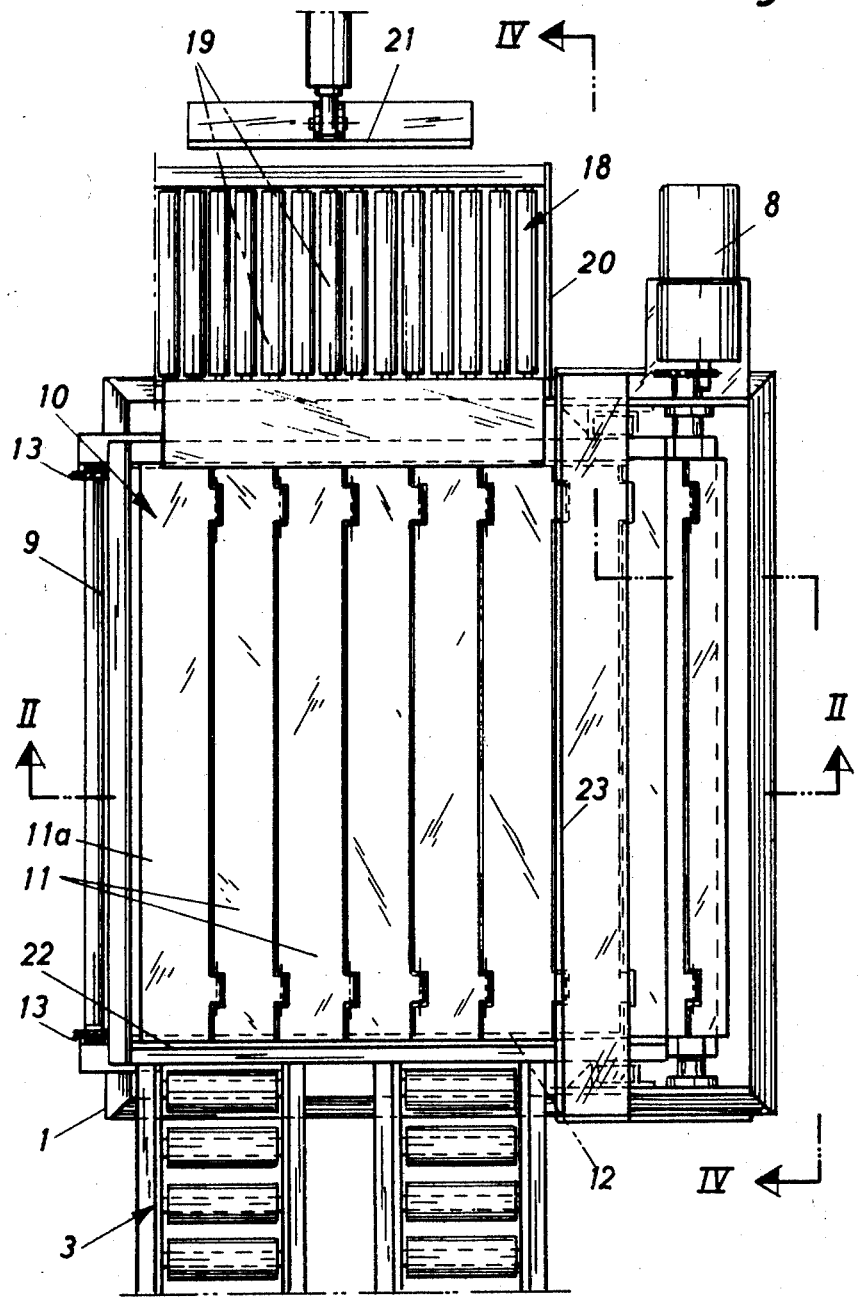

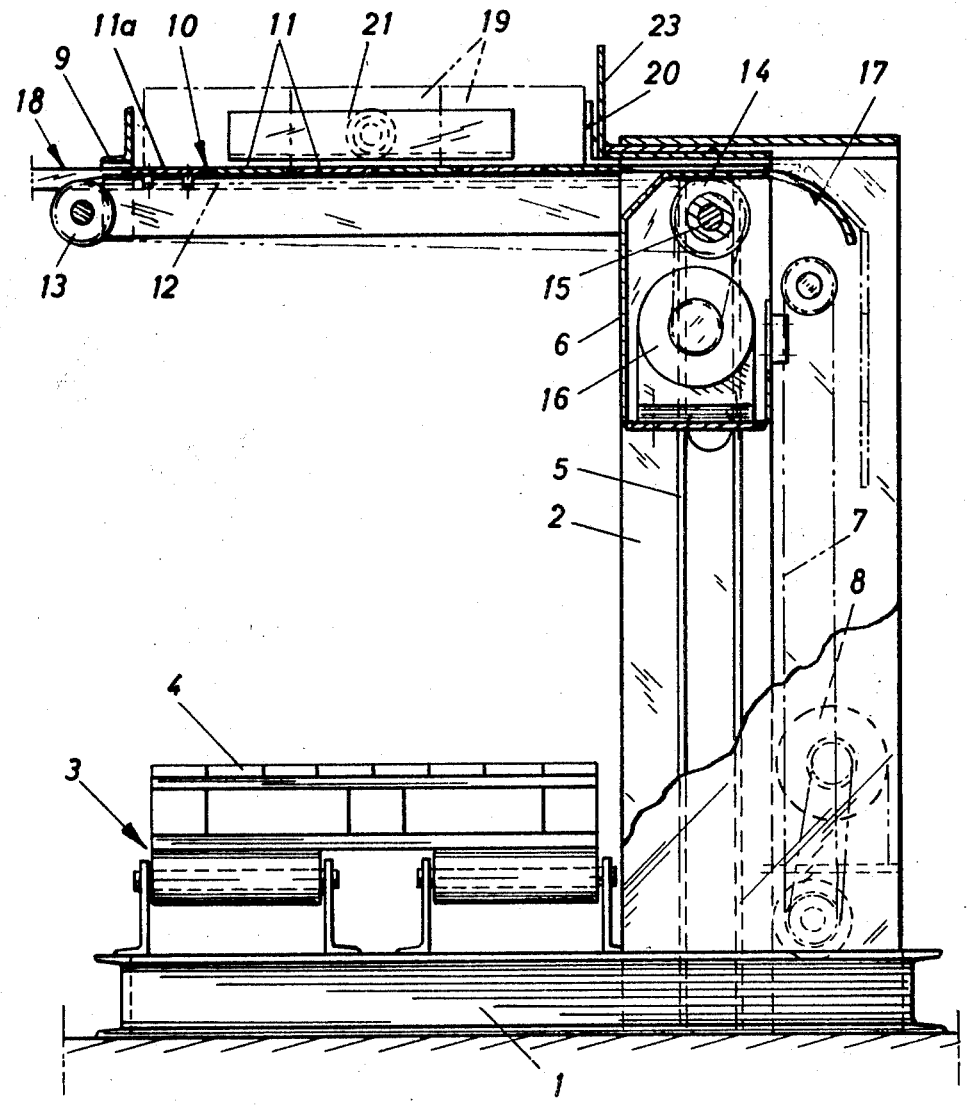

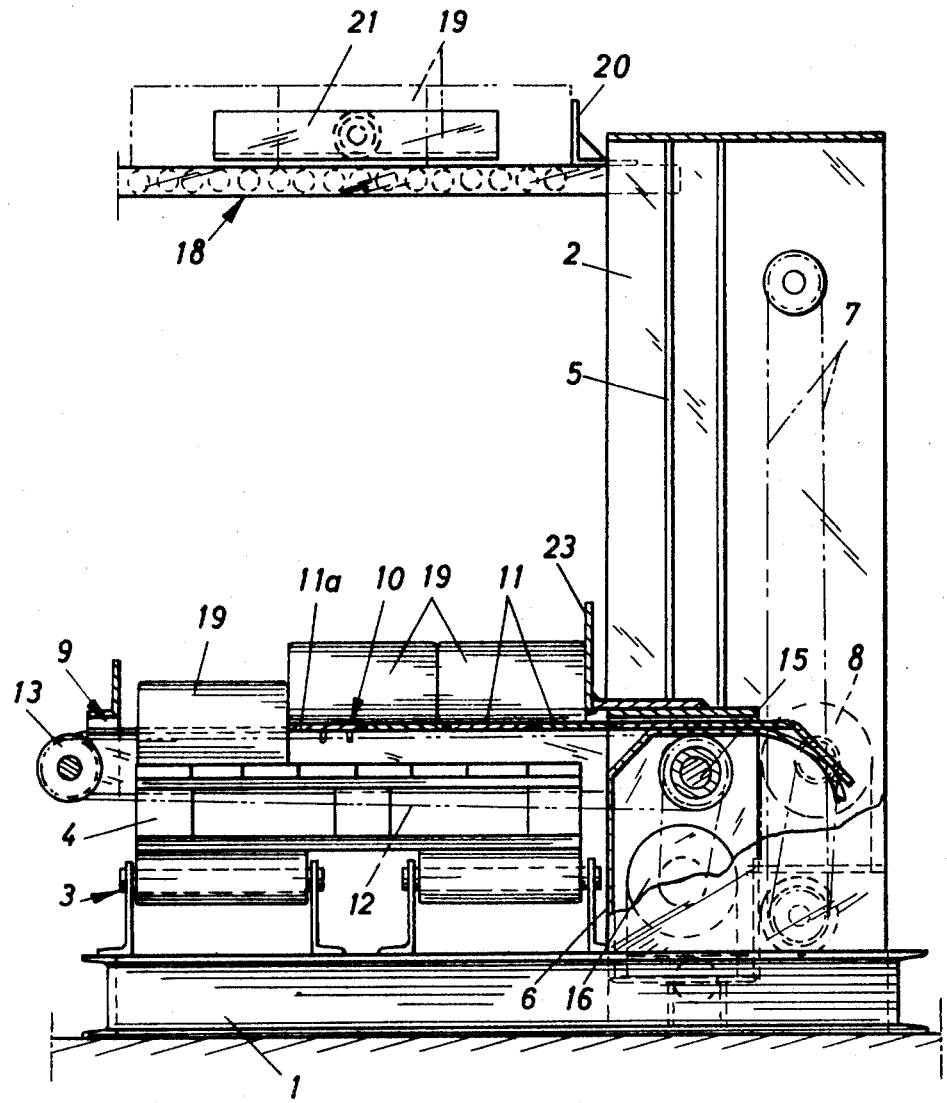

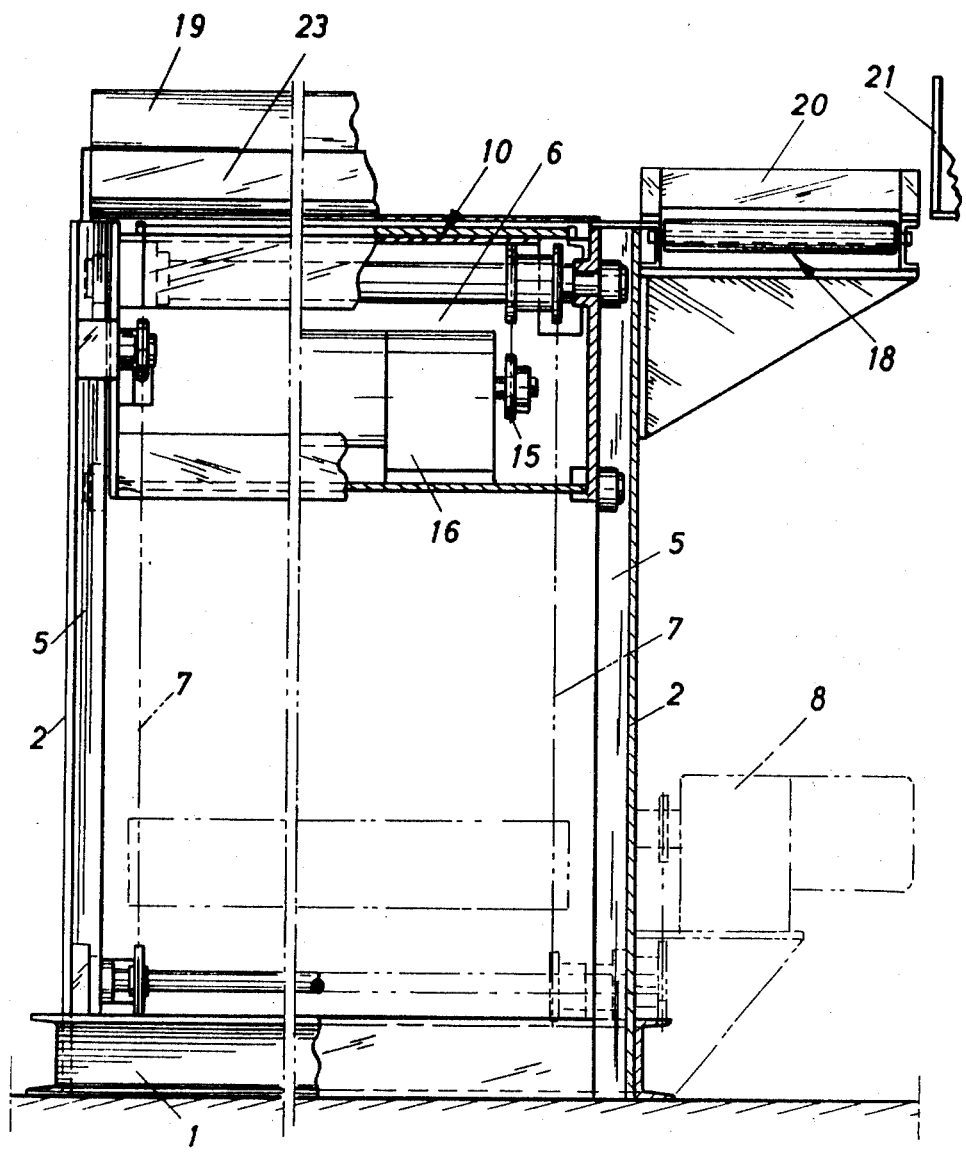

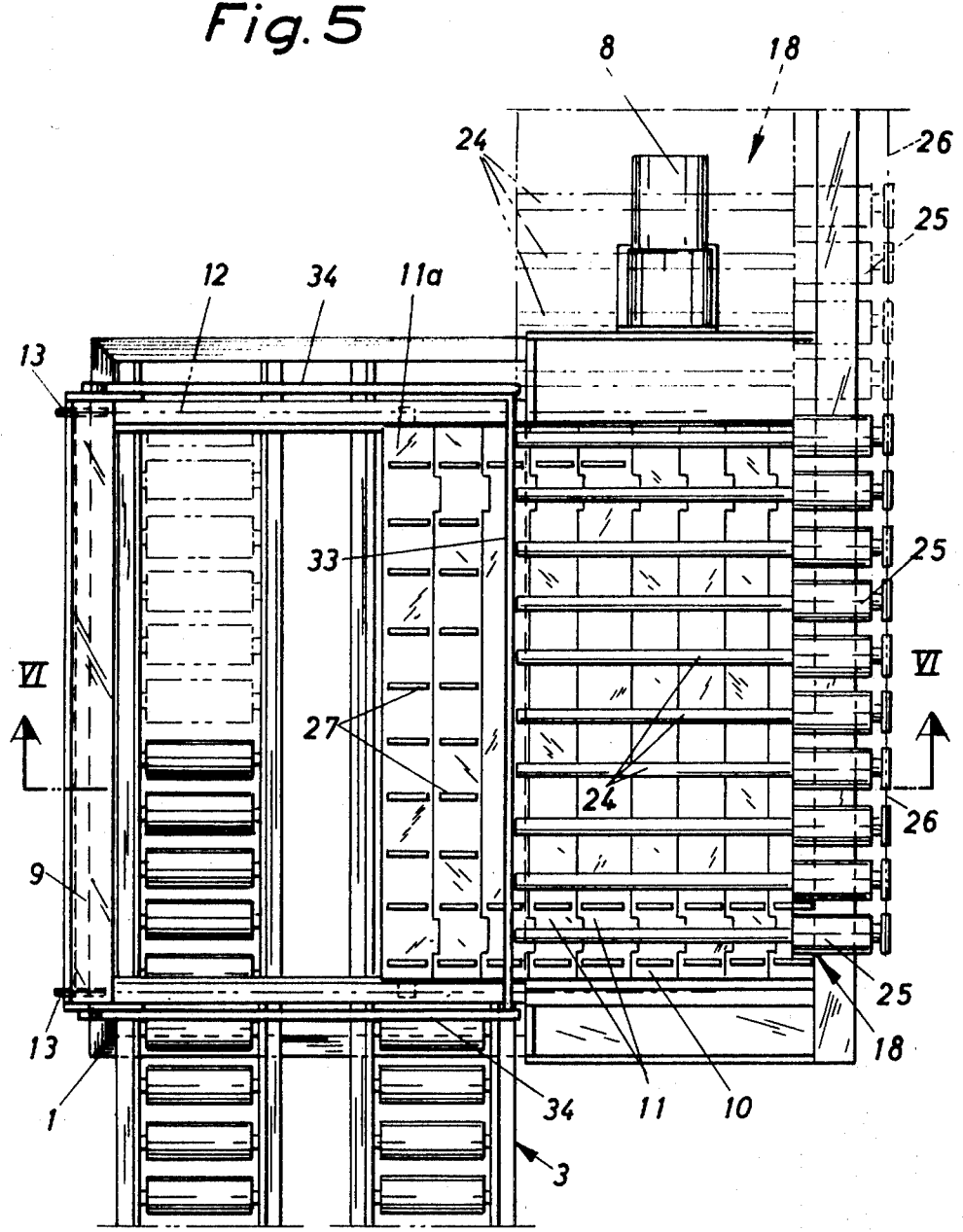

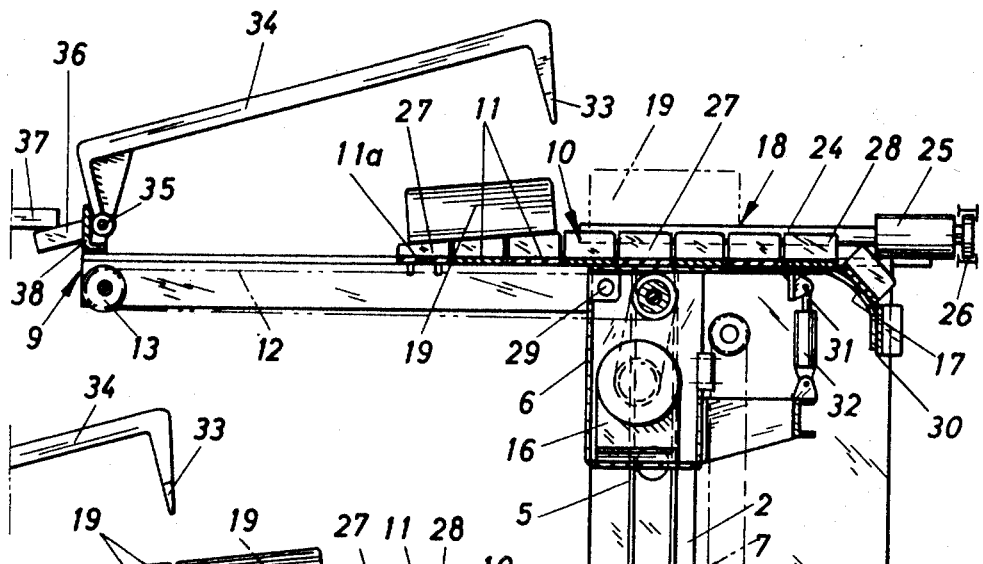
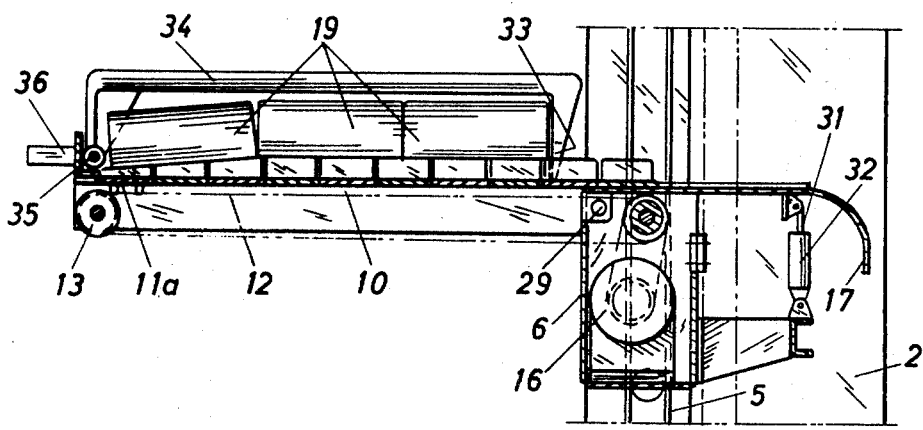

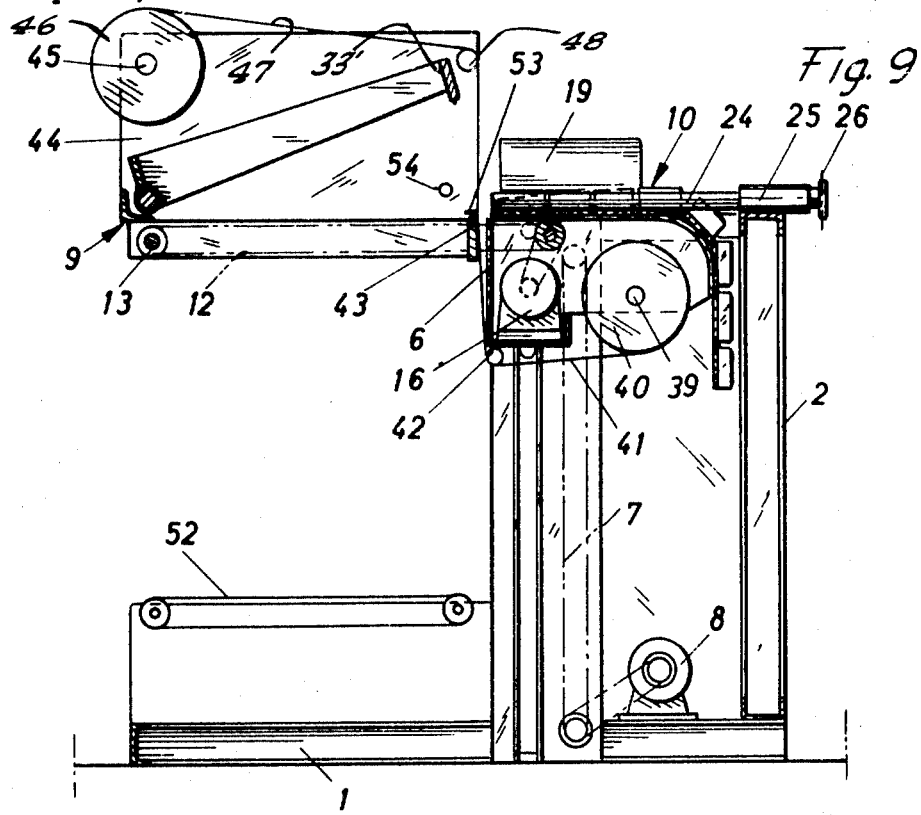
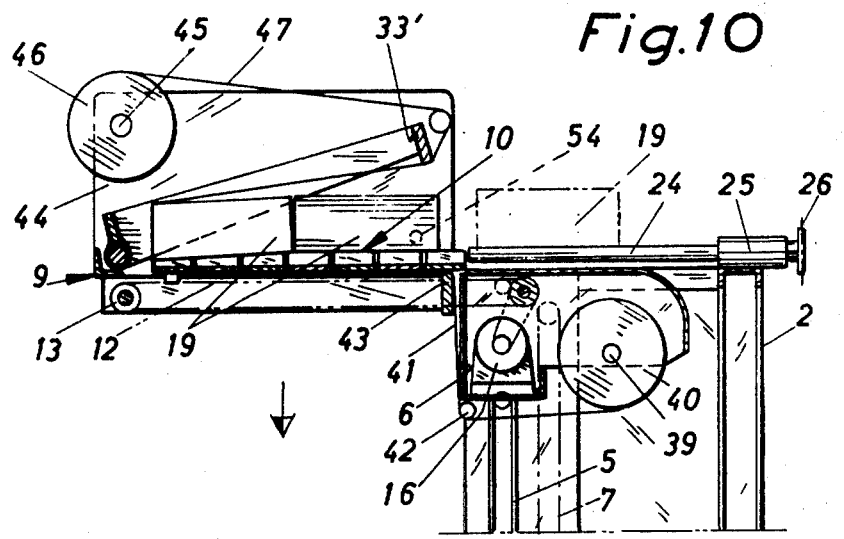

LOADING APPARATUS

Filed Sept. 17, 1968  8 Sheets-Sheet 8

HALVOR GRÅSVOLL,
INVENTOR.

BY Wendwoth, Lind & Ponack
Attorneys

United States Patent Office 3,516,226
Patented June 23, 1970

1

3,516,226
LOADING APPARATUS
Halvor Gråsvoll, Goteborg, Sweden, assignor of one-third each to Gustav G. Magnusson, and Karl I. Weiner, both of Goteborg, Sweden
Filed Sept. 17, 1968, Ser. No. 760,247
Claims priority, application Sweden, Sept. 19, 1967, 12,905/67
Int. Cl. B65b 11/16
U.S. Cl. 53—229                              4 Claims

ABSTRACT OF THE DISCLOSURE

The present invention relates to an apparatus for transferring pieces of goods from a conveyor to a support, e.g., a pallet. The main object of the invention is to render possible a free feeding of objects on the conveyor when pieces of goods are transferred from the conveyor to the support. The object aimed at has been achieved thereby that the apparatus comprises an elevator cage that is vertically displaceable in a stand and that it is provided with a feeder being displaceable back and forth for taking over pieces of goods from the conveyor when the elevator cage is in its upper position, the apparatus further comprising a stripper for transferring the pieces of goods from the feeder onto the support or a layer of pieces of goods on said support when the elevator cage is in its lower position and the feeder is moving away from the stripper.

---

This invention relates to an apparatus for transferring pieces of goods from a conveyor to a support, e.g. a pallet, on a lower level.

The main feature of the invention is to be seen therein that the apparatus comprises an elevator cage which is displaceable upwards and downwards in a stand, said elevator cage being provided with a feeder that is movable back and forth for taking over pieces of goods from the conveyor when the elevator cage is in its upper position, and having a stripper for moving the pieces of goods from the feeder to the support or a layer of goods pieces on the latter when the elevator cage is in its lower position and the feeder moves away from the stripper. Goods may be fed freely on the conveyor when the elevator cage delivers a layer of goods onto the support, i.e. the pallet. Such a loading apparatus may be used for loading cases, boxes and bags in all actual packing patterns.

According to a particularly preferred embodiment of the invention the apparatus comprises a device for discharging two webs of shrink film essentially vertically in front of that place of the elevator cage, when it is in its upper position, where the feeder takes over or feeds goods from the conveyor, the apparatus also including a device known per se for welding the webs to each other and their separation from each other. This shrink film device makes it possible to wrap the pile of pieces of goods transferred to the support in question in shrink film which may be chosen so thick that there is not required any pallet for carrying the pile of goods during its conveyance.

The invention will now be elucidated with reference to the drawings illustrating different embodiments of the loading apparatus. In the drawings:

FIG. 1 is a plan view of the loading apparatus according to the invention,

FIG. 2 shows a vertical section on the line II—II in FIG. 1 of the loading apparatus illustrating the feeder in its upper position, FIG. 3 is a similar section of a side elevation showing the feeder in its lower position,

2

Figure 11:
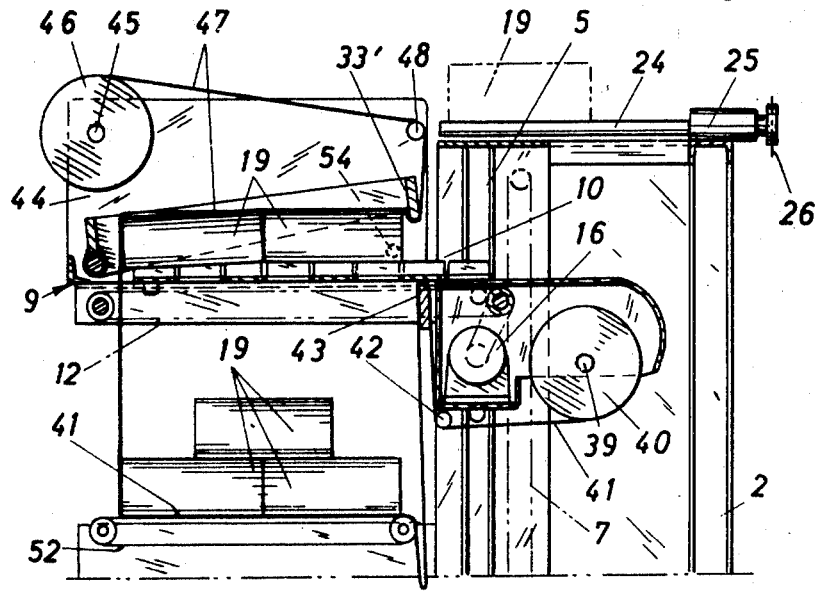
Figure 12:
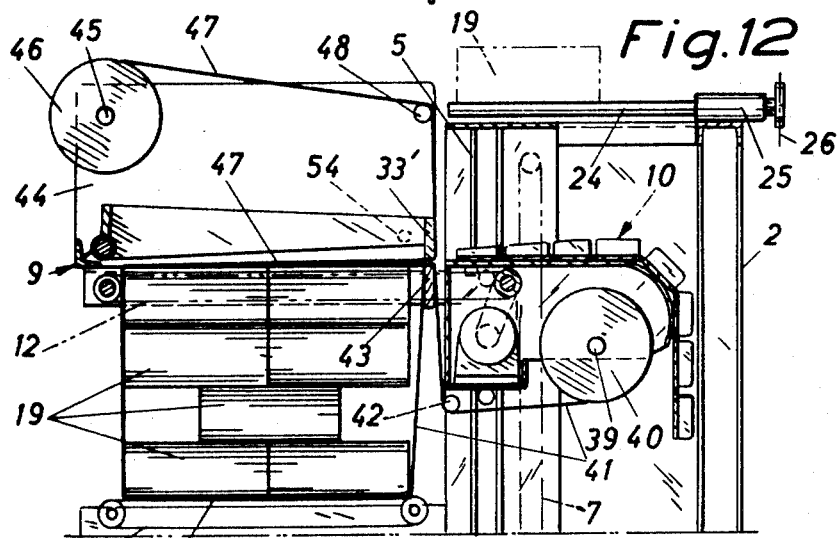
Figure 13:
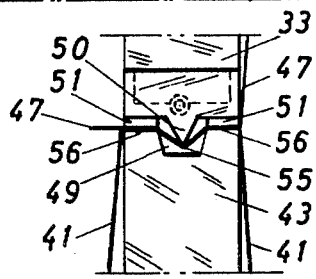

FIG. 4 shows a side elevation partly cut on the line IV—IV in FIG. 1 of the loading apparatus, FIG. 5 is a plan view of a loading apparatus according to another embodiment of the invention, FIGS. 6, 7, and 8 show vertical sections on the line VI—VI in FIG. 5 through the upper portion of the apparatus with the feeder in different advanced positions, FIG. 9 shows a vertical cross section of the loading apparatus according to a third embodiment of the invention provided with two storage rollers of shrink film and showing the feeder in its upper initial position, FIG. 10 shows a similar cross section through the upper portion of the loading apparatus with the feeder moved to its left hand position, FIG. 11 shows a similar cross section showing the elevator cage on its way down towards the support, FIG. 12 illustrates the position of the elevator cage at the welding of the shrink film webs to each other, and FIG. 13 is an end elevation of a means for welding and cutting of the shrink film webs.

The stand of the loading apparatus shown in the drawings comprises a bottom portion 1 and an upright 2. The bottom portion 1 is provided with a roller conveyor 3 for pallets 4. The upright 2 is provided with vertical guides 5 for an elevator cage 6 which by means of chains 7, driven by an electric motor 8, can be vertically displaced along the upright 2. The elevator cage 6 is provided with a loading frame 9 in which there is horizontally movable a feeder 10 which comprises a number of pivotally interconnected elongated plates 11, the front plate 11a of the latter being connected to a chain 12. The latter runs over pulleys 13, 14 and the shaft 15 of the pulley 14 is driven by means of an electric motor 16 on the elevator cage 6. At the rear (according to FIG. 2 the right hand) portion of the loading frame 9 there is arranged a guide sheet 17 inclining downwards at the rear border. At one side of the stand 1, 2 there ends a roller conveyor 18 which extends along one side of the feeder 10 in level with the same when the elevator cage is in its upper position. Pieces of goods 19 arrive successively on this conveyor, these pieces of goods adapted to be loaded on the pallet 4. At the trailing end, the roller conveyor is provided with a stop 20. At the side of the conveyor 18 opposing the feeder 10 there is arranged a pusher 21 for moving the pieces 19 of goods from the conveyor 18 over to the feeder 10. At the border of the loading frame 9 opposing the conveyor 18 there is arranged a stop 22 for restricting the displacement of the piece 19 onto the feeder 10. Arranged at the border of the loading frame 9 situated above the elevator cage 6 is a stripper 23, the feeder 10 being displaceable under the same in the transverse direction of the same.

When a certain number of pieces 19 of goods have arrived on the conveyor 18, the pusher 21 displaces them over to the feeder 10 against the stop 22. The pusher 21 returns to its original position (FIG. 1) and displaces a second row of pieces 19 of goods over to the feeder 10. When the latter is filled of pieces of goods, the motor 8 is started such that the elevator cage 6 with the loading frame 9 and the feeder 10 and the pieces 19 of goods situated thereon be lowered down to the pallet 4. Then the electric motor 16 is started by a sensor (not shown), and this motor 16 moves the feeder 10 to the right according to FIG. 2, the pieces 19 of goods thereat being prevented by the stripper 23 from following the feeder 10 and thus they are stripped off onto the pallet 4. The elevator cage 6 returns to the original position, i.e. the upper position. Meanwhile, the feeder 10 has been returned to its original position (the left hand position according to FIG. 2). The pusher 21 again fills the feeder 10 with pieces 19 of goods. When the elevator cage 6 again is lowered, the pieces 19 of goods will be stripped onto the layer of goods already deposited on the pallet 4. The course of events is repeated until a described number of pieces of goods have been transferred onto the pallet 4. The latter is then moved away on the roller conveyor 3 and an empty pallet is moved in onto the roller conveyor below the loading frame 9.

The embodiment shown in FIGS. 5–8 has no pusher 21. The rollers 24 of the roller conveyor 18 are carried only at one end in the bearing housing 25 and are driven by means of a common chain 26. Abutments or flanges 27 extend up from the plates 11 of the feeder between the rollers and parallel to the same, the upper borders 28 of said flanges 27 being situated on a somewhat lower level than the rollers 24. The guide sheet 17 is by means of its border situated closest to the loading frame 9 journalled about a horizontal shaft 29 and may with its downwards curved rear end 30 be swung upwards by means of a piston and cylinder unit 31, 32 in such a way that the flanges 27 with the upper border 28 reach up above the rollers 24. The front plate 11a and the plates 11 situated closest thereto have flanges 27 somewhat lower than the rest of the plates which incline somewhat down towards the discharge end.

The loading apparatus according to this embodiment is provided with a stripper 33 which is arranged on the outer ends of two parallel arms 34 which are interconnected and journalled about a horizontal shaft 35 at the front border of the loading frame 9. The arms 34 are provided with an arm 36 extending beyond the loading frame 9, this arm 36 at the displacement of the elevator cage to the upper position abutting a stationary abutment 37 which causes a lifting of the stripper 33 (FIG. 6).

The pieces 19 of goods are fed in usual order on the roller conveyor 18 and as the guiding sheet 17 is in its lower position, the piece 19 of goods are fed freely as far as to the stop (not shown) at the final end of the conveyor. The guiding sheet 17 is then lifted by means of the piston and cylinder unit 31, 32 together with the feeder 10 in such a way that the upper borders 28 of the flanges 27 reach up above the rollers 24 and thus lift the pieces 19 of goods from the same. In the swung up position (FIG. 7), the guiding sheet 17 forms a stop for a continued feeding of pieces 19 of goods onto the rollers 24 which are situated above the feeder 10. When the motor 16 then is started and the feeder 10 by the chain 12 is drawn in lateral direction from the roller conveyor 18 against a stop 38 on the front (according to FIG. 6 the left hand) end of the loading frame 9, the pieces 19 of goods are moved in lateral direction from the roller conveyor 18. The electric motor 8 is then started for a lowering of the elevator cage 6. When the arm 36 then eaves the abutment 37, the stripper 33 is swung by its own weight down behind the last piece 19 of goods on the feeder 10. In the lower position of the elevator cage 6 the feeder 10 is retracted (to the right according to FIG. 8), the stripper 33 then preventing the piece of goods from being brought along by the feeder and instead forcing them over onto the layer of goods already loaded on the pallet 4 situated therebelow. Due to the rather low flanges 27 on the front plate 11a, the pieces of goods 19 will softly slide down onto the pallet or the pile of pieces of goods on the same. The elevator cage 6 is relifted to its original position and then the feeder 10 returns to its original position (the right hand position according to FIGS. 6–8). In the upper position of the elevator cage the arm 36 abuts the abutment 37 such that the stripper 33 is lifted and thus gives space for a displacement of pieces 19 of goods below the stripper onto the feeder 10. The course of events is then continuously repeated.

According to the embodiment shown in FIGS. 9–13 a storage roller 40 of shrink foil 41 is journalled on a horizontal shaft 39 on the elevator cage 6, this foil 41 being displaced over a pulley 42 on the elevator cage 6 over a delinking rail 43. Also the loading frame 9 carries in a housing 44 a storage roller 46 of shrink plastic foil 47 journalled about a horizontal shaft 45, the foil running over a pulley 48 in the housing 44 on the loading frame 9 down towards the delinking rail 43. The latter is provided with a longitudinal groove 49 (FIG. 13) adapted to be engaged by a cutting edge 50 heated by means of electrical resistance elements. On either side of the latter are situated welding plates 51 on the lower border of the stripper 33'. The roller conveyor 3 according to FIG. 2 has in the embodiment according to FIGS. 9–13 been replaced by a belt conveyor 52. As a rule no pallet 4 is required in this case.

At the start of the loading apparatus, the shrink foil webs 41 and 47 are supposed to be welded together at 53. When the pieces 19 of goods in the way described in the aforegoing by means of the feeder 10 are moved in over the loading frame 9, the shrink foil web 47 is moved by the front piece 19 of goods in lateral direction (to the left according to FIG. 10), the shrink foil 41 is drawn over the delinking rail 43 and extends under the feeder 10. When the elevator cage 6 then is lowered, the stripper 33' is swung below the last piece 19 of goods on the feeder 10, the stripper then being prevented by a stop 54 under the influence of an electric magnet from being moved to abutment against the delinking rail 43. The cutting edge 50 (FIG. 13) is thereby prevented from cutting off the foil web 41. When the elevator cage 6 has reached its lowermost position, in which the pieces 19 of goods by means of the returning movement of the sheeting are stripped onto the belt conveyor 52, the shrink foil 41 will consequently extend below the bottom layer of pieces of goods on said belt conveyor 52 (see FIG. 11). In a similar way layers of pieces 19 of goods are piled on each other. When the pile is completed (FIG. 12), an impulse is given to the electric magnet (not shown) for the stop 54 which then is moved out of the movement path of the stripper 33'. For this reason the latter may be lowered down to abutment against the delinking rail 43 such that the foil webs 41, 47 thereby are cut off at 55 and they are again welded to each other at 56. The whole of the pile is moved away by the conveyor 52 and is passed through a shrinking tunnel (not shown) where the shrink film is shrunk and brought to closely wrap the pile. If there is used a rather tension resistant shrink film and the pieces 19 of goods are not too heavy and have been packed in such a packing pattern that there is formed a bond, there is obtained a good stability of the wrapping in such a way that, as a rule, there is not required any pallet 4 for carrying the pieces 19 of goods.

The loading apparatus according to the last embodiment can also be used for wrapping one or several layers at a time by shrink film. This is rendered possible quite simply thereby that the stop 54 is retracted each time a layer of pieces of goods is to be enclosed by a shrink foil.

The invention has been described in the aforegoing for purposes of illustration only and is not intended to be restricted by this discription or otherwise except as defined in the appended claims. Thus, the different parts of the loading apparatus may be modified in many ways within the scope of the invention. The electrical or mechanical impulse means which are required when the loading apparatus shall operate fully automatically have not been described or shown as they are known by anyone skilled in the art. Also the first two embodiments may be provided with devices for carrying storage rollers 40, 46 of shrink film in almost the same way as the one shown in FIGS. 9–13. The storage rollers 40, 46 may be carried in a stationary support and thus not following the elevator cage 6 in its vertical movements.

It is also possible to replace the shrink film rollers 40, 46 by storage rollers of cardboard or the like. The cardboard webs or the like may be means of glue and/or clips be attached to each other and be wrapped about the pile of pieces of goods or about single pieces of goods in approximately the same way as described in connection with the shrinking film webs. The cardboard keeps the pieces of goods together and stabilises the pile of pieces of goods during their transportation.

What I claim is:

1. An apparatus for transferring pieces of goods from a conveyor onto a support at a lower level comprising a stand, an elevator cage vertically displaceable in said stand, said elevator cage having a feeder which is displaceable back and forth for taking over the pieces of goods from said conveyor when said elevator cage is in its upper position, a stripper for transferring the goods from said feeder onto said support or onto a layer of pieces of goods on said support when said elevator cage is in its lower position and said feeder is moved away from said stripper, means for discharging two webs of shrink film essentially vertically in front of said elevator cage when in its upper position whereby said feeder feeds pieces of goods from said conveyor and means for welding said webs together and for separating them from each other.

2. An apparatus as claimed in claim 1, wherein storage rollers are mounted in said elevator cage from which said shrink film is unreeled.

3. An apparatus as claimed in claim 1, wherein means are provided for cutting said shrink film webs and welding said webs on said stripper.

4. An apparatus as claimed in claim 1, wherein a grate cooperating with said stripper is provided and cutting of said shrink film webs and the welding of said webs takes place on said grate.

References Cited
UNITED STATES PATENTS

| | | | |
|---|---|---|---|
| 3,392,851 | 7/1968 | Pearne et al. | 53—159 X |
| 3,469,368 | 9/1969 | Churchill et al. | 53—229 |

THERON E. CONDON, Primary Examiner

F. F. DESMOND, Assistant Examiner

U.S. Cl. X.R.

53—159, 182